(12) United States Patent
Margaria et al.

(10) Patent No.: US 10,924,383 B1
(45) Date of Patent: Feb. 16, 2021

(54) UTILIZING SEGMENT ROUTING DATA AND NETWORK DATA TO DETERMINE OPTIMIZED NETWORK PLANS AND TO IMPLEMENT AN OPTIMIZED NETWORK PLAN

(71) Applicant: Juniper Networks, Inc., Sunnyvale, CA (US)

(72) Inventors: Cyril Margaria, Mountain View, CA (US); Ankit Gupta, Princeton, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/369,961

(22) Filed: Mar. 29, 2019

(51) Int. Cl.
*H04L 12/715* (2013.01)
*H04L 12/721* (2013.01)
*H04L 12/803* (2013.01)
*H04L 12/703* (2013.01)

(52) U.S. Cl.
CPC ............. *H04L 45/04* (2013.01); *H04L 45/28* (2013.01); *H04L 45/34* (2013.01); *H04L 47/125* (2013.01)

(58) Field of Classification Search
None
See application file for complete search history.

(56) References Cited

U.S. PATENT DOCUMENTS

| 2006/0050634 | A1 | 3/2006 | Gous | |
| 2017/0171066 | A1* | 6/2017 | Hao | H04L 45/125 |
| 2017/0311295 | A1* | 10/2017 | Soldati | H04W 16/10 |
| 2018/0131616 | A1* | 5/2018 | LaBerge | H04L 47/125 |
| 2018/0176134 | A1* | 6/2018 | Pignataro | H04L 47/12 |
| 2018/0262422 | A1* | 9/2018 | Gerstel | H04L 45/28 |
| 2019/0104031 | A1* | 4/2019 | Garcia-Saavedra | H04L 45/02 |
| 2020/0052981 | A1* | 2/2020 | Pandey | H04B 17/318 |

FOREIGN PATENT DOCUMENTS

EP 2658192 A1 10/2013

OTHER PUBLICATIONS

Extended European Search Report for Application. No. EP19213948.3, dated May 13, 2020, 8 pages.

* cited by examiner

*Primary Examiner* — Chi H Pham
*Assistant Examiner* — Vladislav Y Agureyev
(74) *Attorney, Agent, or Firm* — Harrity & Harrity, LLP

(57) ABSTRACT

A device receives network data associated with a network that includes network devices interconnected by links, wherein the network devices utilize segment routing. The device receives segment routing data associated with the network, wherein the segment routing data at least includes a list of segments associated with paths provided through the network by two or more of the network devices and corresponding links. The device merges the network data and the segment routing data to generate merged data, and processes the merged data, with an optimization model, to determine potential network plans within a particular time period. The device identifies a potential network plan, of the potential network plans, that maximizes throughput associated with operating the network, and performs one or more actions based on the potential network plan.

20 Claims, 11 Drawing Sheets

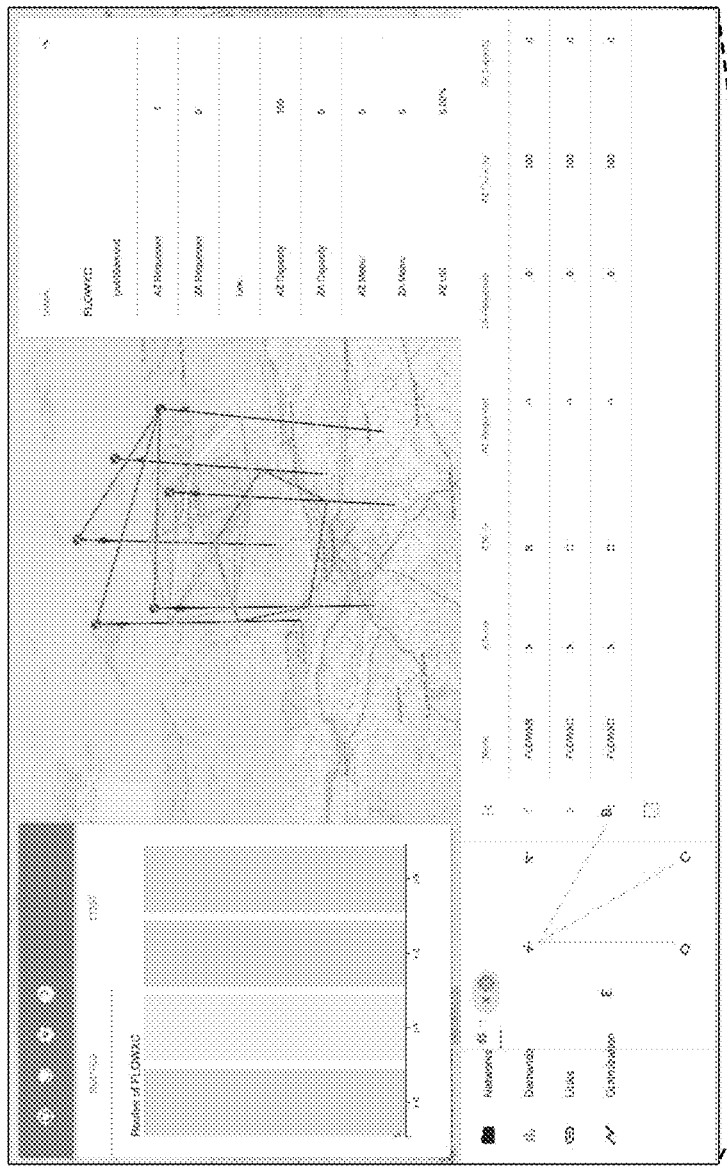
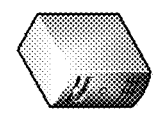
140
Provide, to a client device, information identifying the potential network plans for the network
FIG. 1F

US 10,924,383 B1

UTILIZING SEGMENT ROUTING DATA AND NETWORK DATA TO DETERMINE OPTIMIZED NETWORK PLANS AND TO IMPLEMENT AN OPTIMIZED NETWORK PLAN

BACKGROUND

Network planning and design is an iterative process, encompassing topological design, network synthesis, and network realization. Network planning and design is aimed at ensuring that a new or an existing network or service satisfies needs of network subscribers and/or network operators.

SUMMARY

According to some implementations, a method may include receiving network data associated with a network, wherein the network includes a plurality of network devices interconnected by links, and wherein the plurality of network devices utilizes segment routing. The method may include receiving segment routing data associated with the network, wherein the segment routing data at least includes a list of segments associated with paths provided through the network by two or more of the plurality of network devices and corresponding links of the links. The method may include receiving constraints associated with determining a network plan for the network, wherein the constraints at least include a constraint indicating a particular time period associated with determining a plurality of potential network plans for the network. The method may include merging the network data and the segment routing data to generate merged data, and processing the constraints and the merged data, with an optimization model, to determine a plurality of potential network plans within the particular time period. The method may include identifying a potential network plan, of the plurality of potential network plans, that maximizes throughput associated with operating the network, and performing one or more actions based on the potential network plan.

According to some implementations, a device may include one or more memories; and one or more processors, communicatively coupled to the one or more memories, to receive network data associated with a network, wherein the network includes a plurality of network devices interconnected by links, and wherein the plurality of network devices utilizes segment routing. The one or more processors may receive segment routing data associated with the network, wherein the segment routing data at least includes a list of segments associated with paths provided through the network by two or more of the plurality of network devices and corresponding links of the links. The one or more processors may merge the network data and the segment routing data to generate merged data, and may process the merged data, with a model, to determine a plurality of potential network plans. The one or more processors may identify a potential network plan, of the plurality of potential network plans, that maximizes throughput associated with operating the network, and may perform one or more actions based on the potential network plan.

According to some implementations, a non-transitory computer-readable medium may store instructions that include one or more instructions that, when executed by one or more processors of a device, may cause the one or more processors to receive network data associated with a network, wherein the network includes a plurality of network devices interconnected by links, and wherein the plurality of network devices utilizes segment routing. The one or more instructions may cause the one or more processors to receive segment routing data associated with the network, wherein the segment routing data at least includes one or more of a list of segments associated with paths provided through the network by two or more of the plurality of network devices and corresponding links of the links, data identifying the segments provided in the list of segments, statistics associated with the segments, or forwarding instructions associated with the segments. The one or more instructions may cause the one or more processors to merge the network data and the segment routing data to generate merged data, and process the merged data, with an optimization model, to determine a plurality of potential network plans. The one or more instructions may cause the one or more processors to identify a potential network plan, of the plurality of potential network plans, that maximizes throughput associated with operating the network, and perform one or more actions based on the potential network plan.

BRIEF DESCRIPTION OF THE DRAWINGS

FIGS. 1A-1F are diagrams of one or more example implementations described herein.

DETAILED DESCRIPTION

Figure 1A:
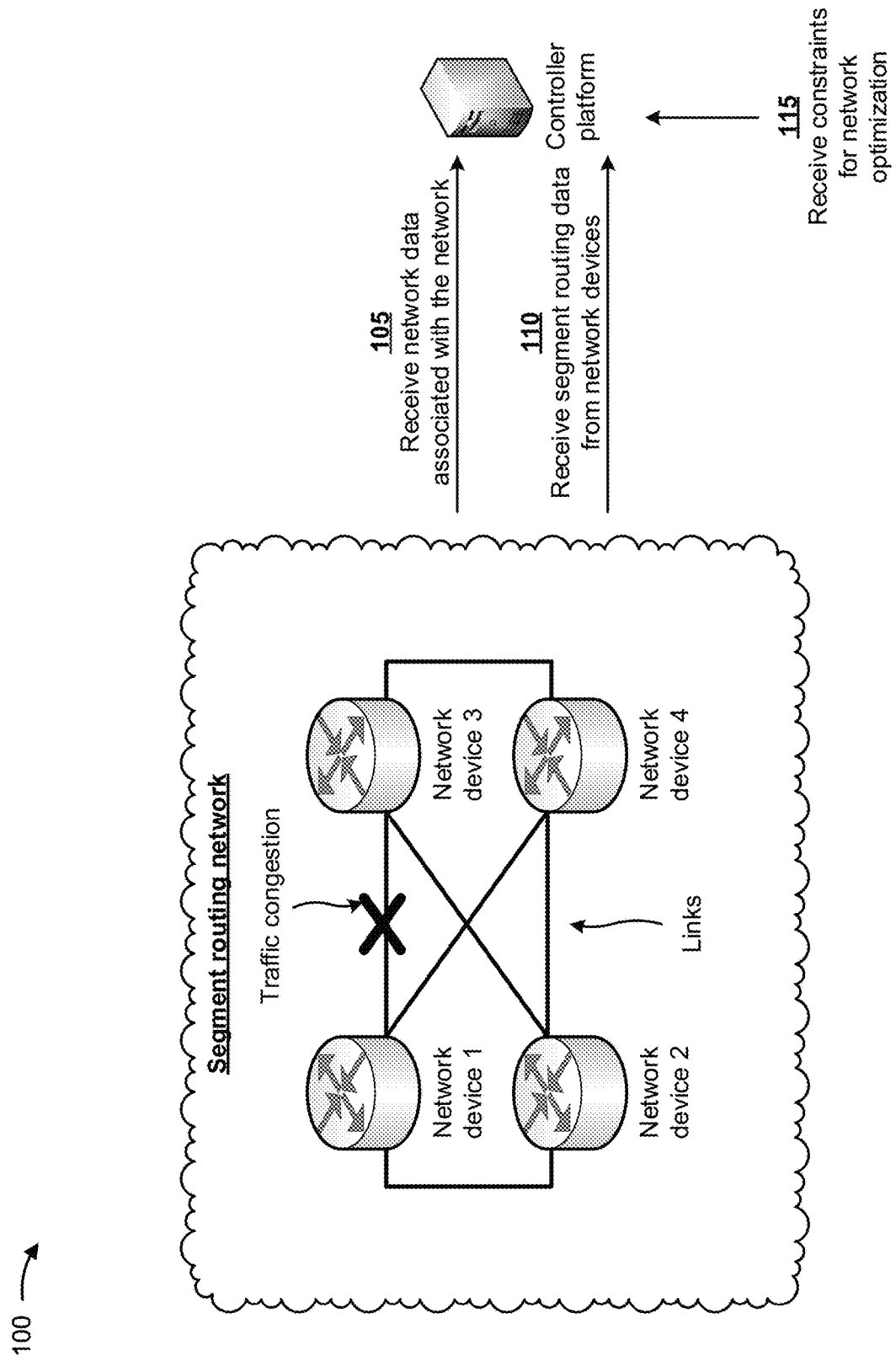

The following detailed description of example implementations refers to the accompanying drawings. The same reference numbers in different drawings may identify the same or similar elements.

A network planning and design system may design a network that includes network devices (e.g., routers, switches, gateways, firewalls, and/or the like) and links provided between the network devices. Segment routing, a form of computer networking, is a variant of source routing. In a segment routing network, an ingress network device may prepend a header to packets (e.g., traffic) that contain a list of segments, which are instructions that are executed on subsequent network devices in the network. These instructions may include forwarding instructions, such as an instruction to forward a packet to a specific destination or interface.

However, in segment routing, no state or session information is maintained when paths are created between network devices. Without the state or session information, the network devices are unaware of traffic congestion, traffic throughput, operational states and/or the like associated with the paths. This causes traffic to be lost and causes computing resources (e.g., processing resources, memory resources, and/or the like), networking resources, and/or the like to be wasted in identifying the lost traffic, correcting non-operational paths, re-routing the lost traffic, and/or the like.

Some implementations described herein provide a controller platform that utilizes segment routing data and network data to determine optimized network plans and to implement an optimized network plan. For example, the controller platform may receive network data associated with a network, wherein the network includes network devices interconnected by links, and wherein the network devices utilize segment routing. The controller platform may receive segment routing data associated with the network, wherein the segment routing data at least includes a list of segments associated with paths provided through the network by two or more of the network devices and corresponding links of the links. The controller platform may merge the network data and the segment routing data to generate merged data, and may process the merged data, with a model, to determine potential network plans. The controller platform may identify a potential network plan, of the potential network plans, that optimizes operation of the network (e.g., maximizes throughput associated with operating the network), and may perform one or more actions based on the potential network plan.

In this way, the segment routing information may enable the controller platform to determine and implement an optimized network plan in a reduced amount of time. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, identifying lost traffic, correcting non-operational paths, re-routing lost traffic, and/or the like.

FIGS. 1A-1F are diagrams of one or more example implementations 100 described herein. As shown in FIG. 1A, a network may be associated with a controller platform. In some implementations, the network may include a packet optical network with multiple network devices and multiple links provided between the multiple network devices. In some implementations, the network may include a segment routing network in which an ingress network device may prepend a header to packets that contain a list of segments, which are instructions that are executed on subsequent network devices in the network. These instructions may include forwarding instructions, such as an instruction to forward a packet to a specific destination or interface.

As further shown in FIG. 1A, and by reference number 105, the controller platform may receive network data associated with the network. In some implementations, the network data may include topology data associated with the network, path data associated with the network, and/or the like. The topology data may include data identifying the network devices (e.g., data identifying types of the network devices, network identifiers of the network devices, locations of the network devices, hardware and/or software associated with the network devices, other network devices that are adjacent to the network devices, links connected to the network devices, ports associated with the network devices, and/or the like); the links interconnecting the network devices (e.g., data identifying types of the links, protocols used by the links, network devices to which the links are connected, ports associated with the network devices, operational states of the links, and/or the like); utilizations of the network devices (e.g., capacities of the network devices, throughputs of the network devices, operational states of the network devices, and/or the like); and/or the like. The path data may include data identifying paths through the network provided by the network devices, sources (e.g., one or more of the network devices, and/or the like) of the paths through the network, destinations (e.g., one or more of the network devices, and/or the like) of the paths through the network, utilizations of the paths through the network (e.g., capacities of the paths, throughputs of the paths, and/or the like), and/or the like. In some implementations, the network data may include data identifying a problem in the network, such as traffic congestion, non-operational network devices, non-operational links, and/or the like.

The controller platform may periodically receive the network data from the network (e.g., at particular time intervals in seconds, minutes, hours, days, and/or the like), may continuously receive the network data from the network, and/or the like. For example, the controller platform may provide, to the network devices, a request for the network data, and the network devices may provide the network data to the controller platform based on the request.

As further shown in FIG. 1A, and by reference number 110, the controller platform may receive segment routing data from the network devices. In some implementations, the segment routing data may include data identifying a list of segments associated with paths provided through the network by the network devices and corresponding links, the segments provided in the list of segments, statistics associated with the segments, forwarding instructions associated with the segments, and/or the like.

The controller platform may periodically receive the segment routing data from the network devices (e.g., at particular time intervals in seconds, minutes, hours, days, and/or the like), may continuously receive the segment routing data from the network device, and/or the like. For example, the controller platform may provide, to the network devices, a request for the segment routing data, and the network devices may provide the segment routing data to the controller platform based on the request.

As further shown in FIG. 1A, and by reference number 115, the controller platform may receive (e.g., from a client device) constraints for network optimization. In some implementations, the constraints may include a constraint indicating a particular time period associated with determining the network plan for the network, a constraint indicating a failure threshold associated with paths provided through the network by the network devices and the links, a constraint indicating capacities of the links, a constraint indicating possible paths for a traffic demand of the network, a constraint indicating no possible paths for the traffic demand, and/or the like. The constraint indicating the failure threshold may include a threshold count associated with a traffic demand failure by the network plan (e.g., discard a network plan that includes traffic demand failures exceeding the threshold count). The threshold count may be based on capacities of the links, a set of possible paths through the network for a traffic demand, and/or a constraint indicating whether there is a certain path for the traffic demand or no possible path for the traffic demand.

Although FIG. 1A shows specific quantities of network devices, links, and/or the like, in some implementations, the network may include more (or less) network devices, links, and/or the like than depicted in FIG. 1A. For example, the network may include hundreds, thousands, and/or the like of network devices and/or links that generate thousands, millions, billions, etc. of data points. In this way, the controller platform may handle thousands, millions, billions, etc. of data points within a time period (e.g., when determining network plans), and thus may provide "big data" capability.

Figure 1B:
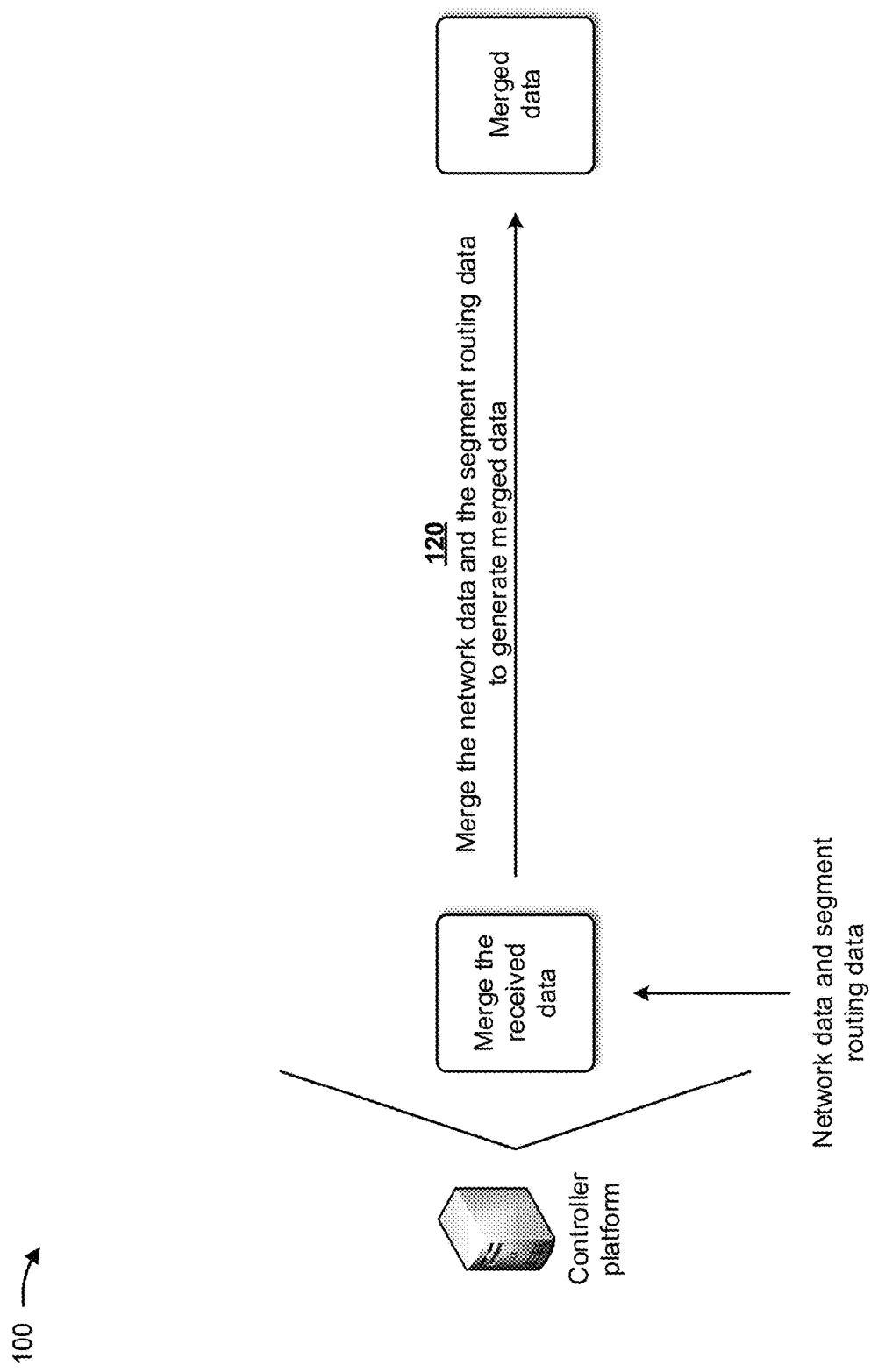

As shown in FIG. 1B, and by reference number 120, the controller platform may merge the network data to the segment routing data to generate merged data. In some implementations, the controller platform may store the network data, the segment routing data, and/or the merged data in one or more data structures (e.g., databases, lists, tables, and/or the like) associated with the controller platform. In some implementations, the controller platform may utilize a merging technique to merge the network data and the segment routing data. The controller platform may utilize the merging technique to collect data for a specific variable (e.g., paths provided through the network by the network devices) from different sources (e.g., the network data and the segment routing data). In some implementations, the merged data may include a unique record per category of the specific variable. Thus, the controller platform may integrate different pieces of the network data and the segment routing data by utilizing a match-merge with nonmatched data technique. For example, the network data may include the following data:

| Network Device ID | Capacity | Operational State |
|---|---|---|
| 1 | 100% | Operational |
| 2 | 10% | Operational |
| 4 | 20% | Non-operational |
| 5 | 50% | Operational |

And, in this example, the segment routing data may include the following data:

| Network Device ID | Path | Segment Numbers |
|---|---|---|
| 2 | A | 2-6-9 |
| 4 | B | 3-4-8 |

In this example, the controller platform may combine the network routing data and the segment routing data to generate merged data that includes the following data:

| Network Device ID | Capacity | Operational State | Path | Segment Numbers |
|---|---|---|---|---|
| 1 | 100% | Operational | — | — |
| 2 | 10% | Operational | A | 2-6-9 |
| 4 | 20% | Non-operational | B | 3-4-8 |
| 5 | 50% | Operational | — | — |

In some implementations, the controller platform may remove, from the merged data, data identifying network devices not associated with paths and/or segment numbers. This may reduce a quantity of data points associated with the merged data. In this way, the controller platform may conserve resources (e.g., processing resources, memory resources, and/or the like) associated with processing the merged data (e.g., as described below), storing the merged data, and/or the like.

Figure 1C:
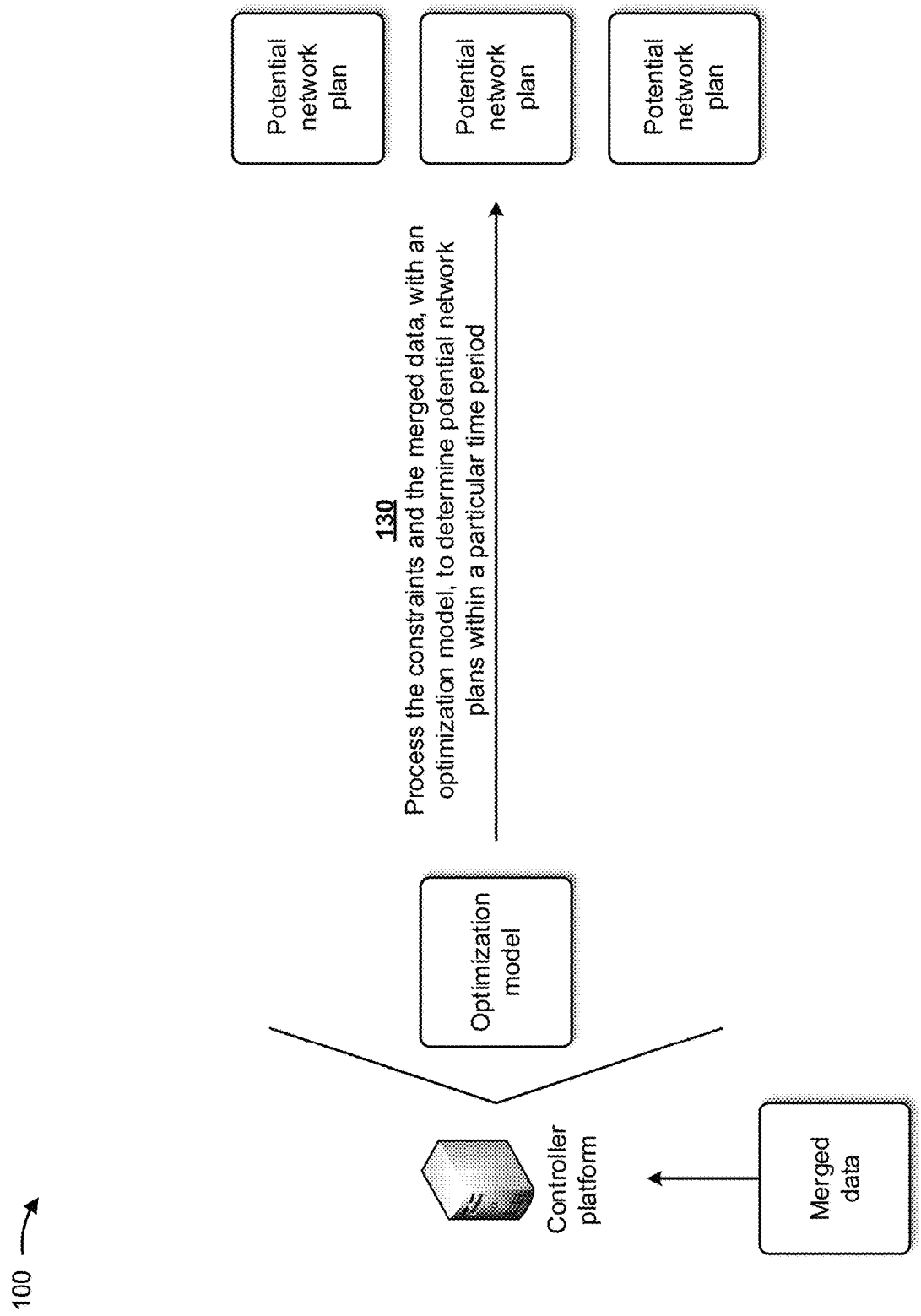

As shown in FIG. 1C, and by reference number 130, the controller platform may process the constraints and the merged data with an optimization model to determine potential network plans within a particular time period (e.g., as specified by the constraint indicating the particular time period associated with determining the network plan). The controller platform may train the optimization model with historical data (e.g., historical network data, historical segment routing data, historical merged data, and/or the like) to identify network plans that improve throughput of a network.

In some implementations, the controller platform may train the optimization model, with the historical data, to determine potential network plans that improve throughput of a network. For example, the controller platform may separate the historical data into a training set, a validation set, a test set, and/or the like. The training set may be utilized to train the optimization model. The validation set may be utilized to validate results of the trained optimization model. The test set may be utilized to test operation of the optimization model.

In some implementations, the controller platform may train the optimization model using, for example, an unsupervised training procedure and based on the historical data. For example, the controller platform may perform dimensionality reduction to reduce the historical data to a minimum feature set, thereby reducing resources (e.g., processing resources, memory resources, and/or the like) to train the optimization model, and may apply a classification technique to the minimum feature set.

In some implementations, the controller platform may use a logistic regression classification technique to determine a categorical outcome (e.g., that the historical data identifies potential network plans that improve throughput of a network). Additionally, or alternatively, the controller platform may use a naïve Bayesian classifier technique. In this case, the controller platform may perform binary recursive partitioning to split the historical data into partitions and/or branches and use the partitions and/or branches to determine outcomes (e.g., that the historical data identifies potential network plans that improve throughput of a network). Based on using recursive partitioning, the controller platform may reduce utilization of computing resources relative to manual, linear sorting and analysis of data points, thereby enabling use of thousands, millions, or billions of data points to train the optimization model, which may result in a more accurate model than using fewer data points.

Additionally, or alternatively, the controller platform may use a support vector machine (SVM) classifier technique to generate a non-linear boundary between data points in the training set. In this case, the non-linear boundary is used to classify test data into a particular class.

Additionally, or alternatively, the controller platform may train the optimization model using a supervised training procedure that includes receiving input to the optimization model from a subject matter expert, which may reduce an amount of time, an amount of processing resources, and/or the like to train the optimization model relative to an unsupervised training procedure. In some implementations, the controller platform may use one or more other model training techniques, such as a neural network technique, a latent semantic indexing technique, and/or the like. For example, the controller platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained optimization model generated by the controller platform by being more robust to noisy, imprecise, or incomplete data, and by enabling the controller platform to detect patterns and/or trends undetectable to human analysts or systems using less complex techniques.

In some implementations, if the particular time period is small (e.g., in seconds or minutes), the controller platform may determine a first quantity of potential network plans, and if the particular time period is larger (e.g., in minutes or hours), the controller platform may determine a second quantity of potential network plans that is larger than the first quantity of potential network plans. Thus, the particular time period may be utilized (e.g., by a user of the controller platform) to determine resource usage of the controller platform and/or the quantity of potential network plans generated by the controller platform.

In some implementations, the controller platform may utilize the constraints to set values of variables in the merged data, specify minimums for the values of the variables, specify maximums for the values of the variables, change the values of the variables, determine quickly whether the values of the variables result in a solution (e.g., a potential network plan), and/or the like. Such information may be utilized by the controller platform when determining the potential network plans. In some implementations, the controller platform may identify, based on the merged data, a non-operational one of the links and/or the network devices associated with one of the paths provided through the network, and may determine a particular network plan of the potential network plans that reroutes traffic away from the non-operational one of the links and/or the network devices.

In some implementations, the controller platform may assign throughputs to the potential network plans based on a variety of factors, such as quantities of network devices utilized in the potential network plans, quantities and lengths of links utilized in the potential network plans, utilizations of utilized network devices, utilizations of the links, and/or the like. For example, each factor may be associated with a respective throughput (e.g., a particular type of network device may have greater throughput than another type of network device), and the controller platform may assign the respective throughputs to the different factors based on the potential network plan.

In some implementations, the controller platform may assign costs to the potential network plans based on a variety of factors, such as quantities of network devices utilized in the potential network plans, quantities and lengths of links utilized in the potential network plans, utilizations of utilized network devices, utilizations of the links, and/or the like. For example, each factor may be associated with a respective cost (e.g., a link may cost more than a network device), and the controller platform may assign the respective costs to the different factors based on the potential network plan. In some implementations, the controller platform may determine penalties associated with failures of the potential network plans in meeting traffic demands of the network, and may add the penalties to the costs assigned to the potential network plans.

Figure 1D:
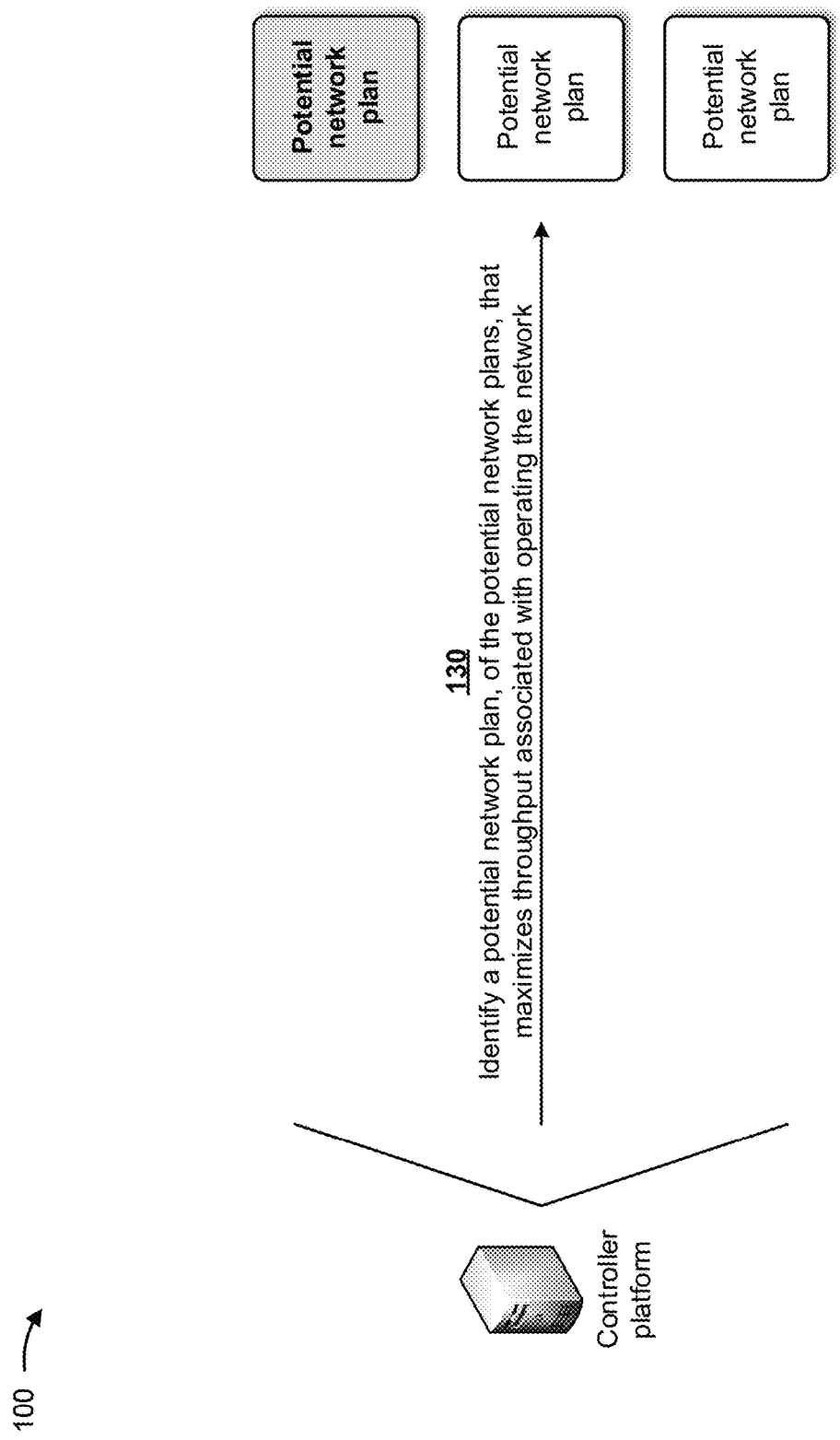

As shown in FIG. 1D, and by reference number 130, the controller platform may identify a potential network plan, of the potential network plans, that maximizes throughput associated with operating the network (e.g., reduces resource usage by the network). In some implementations, the controller platform may compare the throughputs and/or costs determined for each of the potential network plans, and may select a potential network plan with a highest throughput and/or a lowest cost. In some implementations, the controller platform may select a potential network plan with a lowest quantity of traffic demand failures, even if the potential network plan does not provide the highest throughput and/or the lowest cost. The controller platform may select a potential network plan with a lowest quantity of traffic demand failures, a highest throughput, and a lowest cost. In some implementations, the controller platform may provide information identifying the potential network plans to a client device, and may receive a selection of a potential network plan from the client device. The controller platform may utilize the potential network plan identified by the selection.

In some implementations, the controller platform may determine that one or more of the potential network plans fail to satisfy a particular constraint and may remove the one or more of the potential network plans from the potential network plans to generate a subset of the potential network plans. In such implementations, the controller platform may identify the potential network plan from the subset of the potential network plans.

Figure 1E:
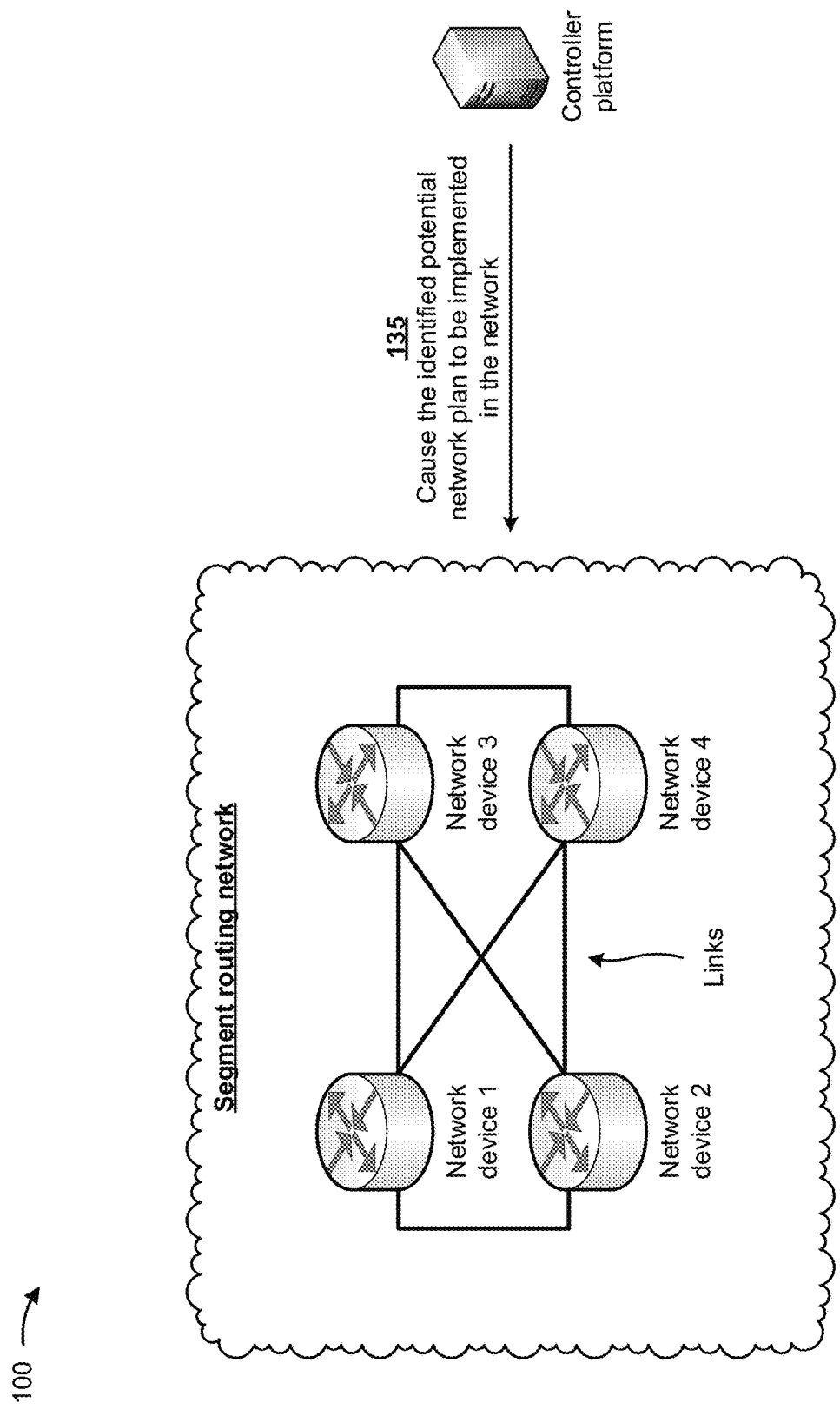

As shown in FIG. 1E, and by reference number 135, the controller platform may cause the identified potential network plan to be implemented in the network. In some implementations, the controller platform may cause the identified potential network plan to be implemented in the network by providing, to one or more of the network devices, instructions indicating that the one or more network devices, and the links associated with the one or more network devices, are to implement the identified potential network plan. The one or more network devices may receive the instructions and may implement the identified potential network plan based on the instructions. For example, the controller device may provide, to three network devices, instructions indicating that the three network devices (e.g., and two links provided between the three network devices) are to reserve bandwidth for a traffic demand (e.g., to address traffic congestion as shown in FIG. 1A). The three network devices may receive the instructions and may reserve the bandwidth for the traffic demand based on the instructions.

In some implementations, the controller platform may receive additional network data and additional segment routing data from the network based on causing the identified potential network plan to be implemented in the network, and may modify the identified potential network plan based on the additional network data and the additional segment routing data to generate a modified potential network plan. For example, if the additional network data indicates that a portion of the network is failing to manage a new traffic demand, the controller platform may modify the identified potential network plan to manage the new traffic demand. The controller platform may then cause the modified potential network plan to be implemented in the network, as described above in connection with FIGS. 1A-1E.

As shown in FIG. 1F, and by reference number 140, the controller platform may provide, to a client device, information identifying the potential network plans for the network. The client device may receive the information identifying the potential network plans and may provide the information identifying the potential network plans for display via a user interface. The user interface may enable a user of the client device to view features associated with the potential network plans, to see a graphical representation of selected potential network plans, to select a potential network plan for implementation, and/or the like.

In some implementations, the controller platform may receive the network data and the segment routing data, and may merge the network data and the segment routing data to generate the merged data. The controller platform may utilize the merged data with the optimization model to determine a solution to a traffic problem and/or to automatically solve the traffic problem, and may perform one or more actions based on the solution (e.g., automatically cause an optimized network plan to be implemented in the segment routing network, provide potential network plans that solve the traffic problem to a client device, and/or the like). For example, if the segment routing data indicates that a path in the segment routing network utilizes particular segments (e.g., segments 1-6-5) and the network data indicates that the path is from a first network device and a tenth network device, the controller platform may optimize the path (e.g., to utilize other particular segments (e.g., segments 1-6-8), a second network device, and a fifth network device) for the path to have greater throughput.

In this way, the controller platform may utilize segment routing data and network data to determine and implement an optimized network plan in a reduced amount of time. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, and/or the like. Furthermore, implementations described herein use a rigorous, computerized process to perform tasks that were not previously performed. For example, currently there does not exist a technique that utilize segment routing data and network data to determine and implement an optimized network plan.

As indicated above, FIGS. 1A-1F are provided merely as examples. Other examples may differ from what is described with regard to FIGS. 1A-1F.

Figure 2:
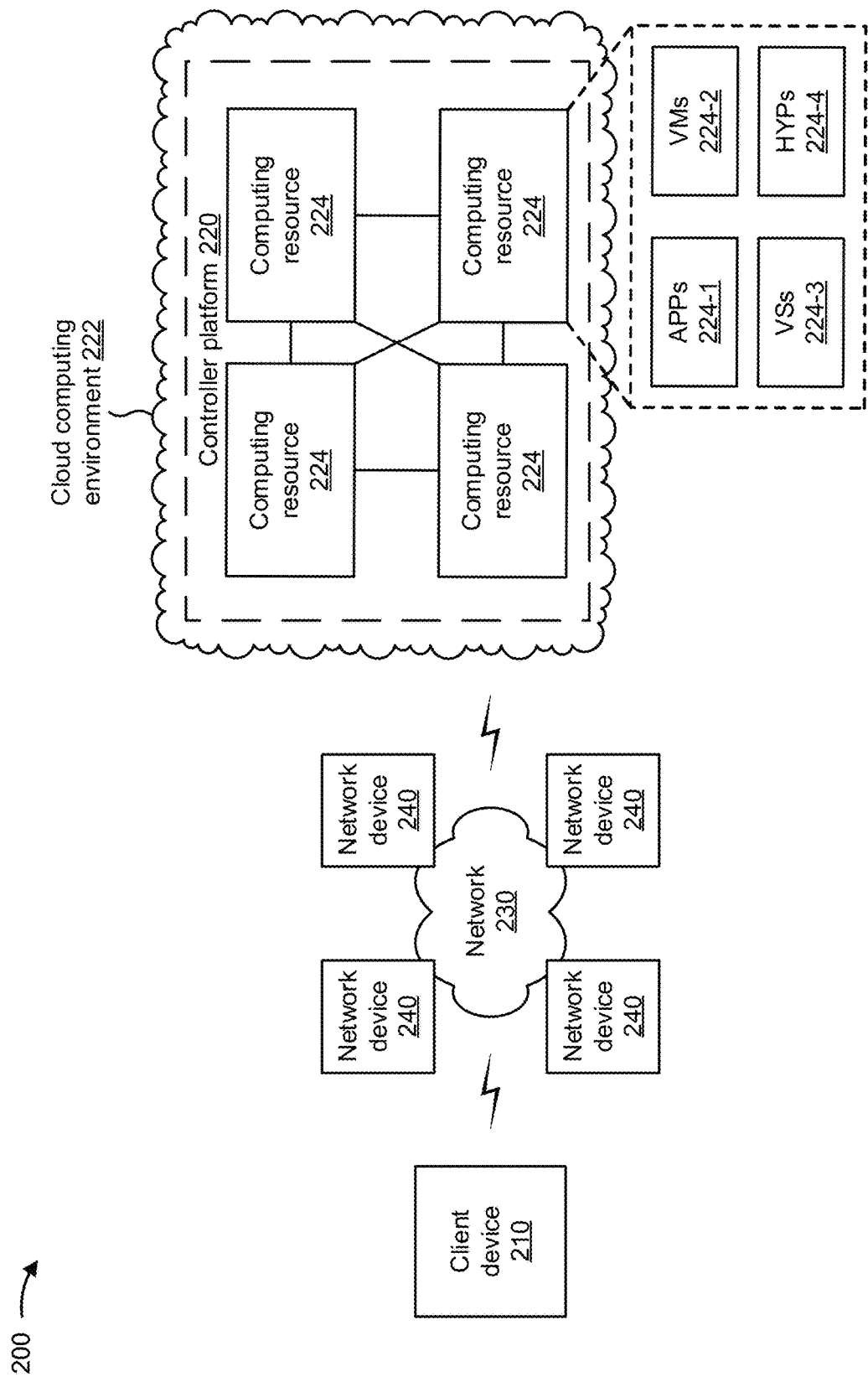
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a controller platform 220, a network 230, and a group of network devices 240 of network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to controller platform 220, via network 230 and network devices 240. In some implementations, client device 210 may receive network traffic from and/or may provide network traffic to other client devices 210 via network 230 (e.g., by routing packets using network devices 240 as intermediaries).

Controller platform 220 includes one or more devices that utilize segment routing data and network data to determine optimized network plans and to implement an optimized network plan. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more client devices 210 and/or network devices 240.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, etc., services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 240 may include a gateway, a switch, a firewall, a hub, a bridge, a reverse proxy, a server (e.g., a proxy server, a cloud server, a data center server, etc.), a load balancer, and/or a similar device. In some implementations, network device 240 may be a physical device implemented within a housing, such as a chassis. In some implementations, network device 240 may be a virtual device implemented by one or more computer devices of a cloud computing environment or a data center. In some implementations, a group of network devices 240 may be a group of data center nodes that are used to route traffic flow through network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
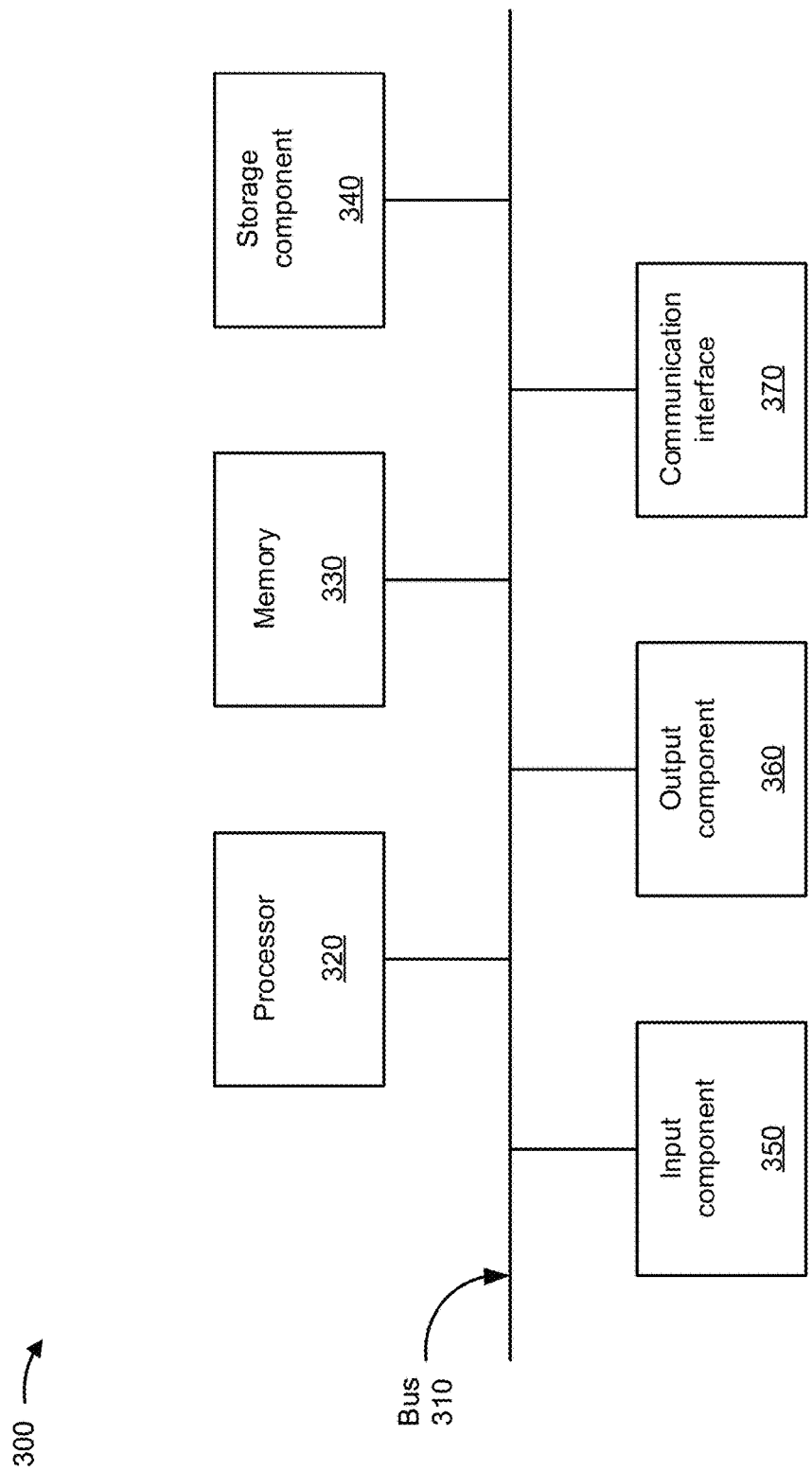
FIG. 3 is a diagram of example components of one or more devices of FIG. 2.

FIG. 3 is a diagram of example components of a device 300. Device 300 may correspond to client device 210, controller platform 220, computing resource 224, and/or network device 240. In some implementations, client device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
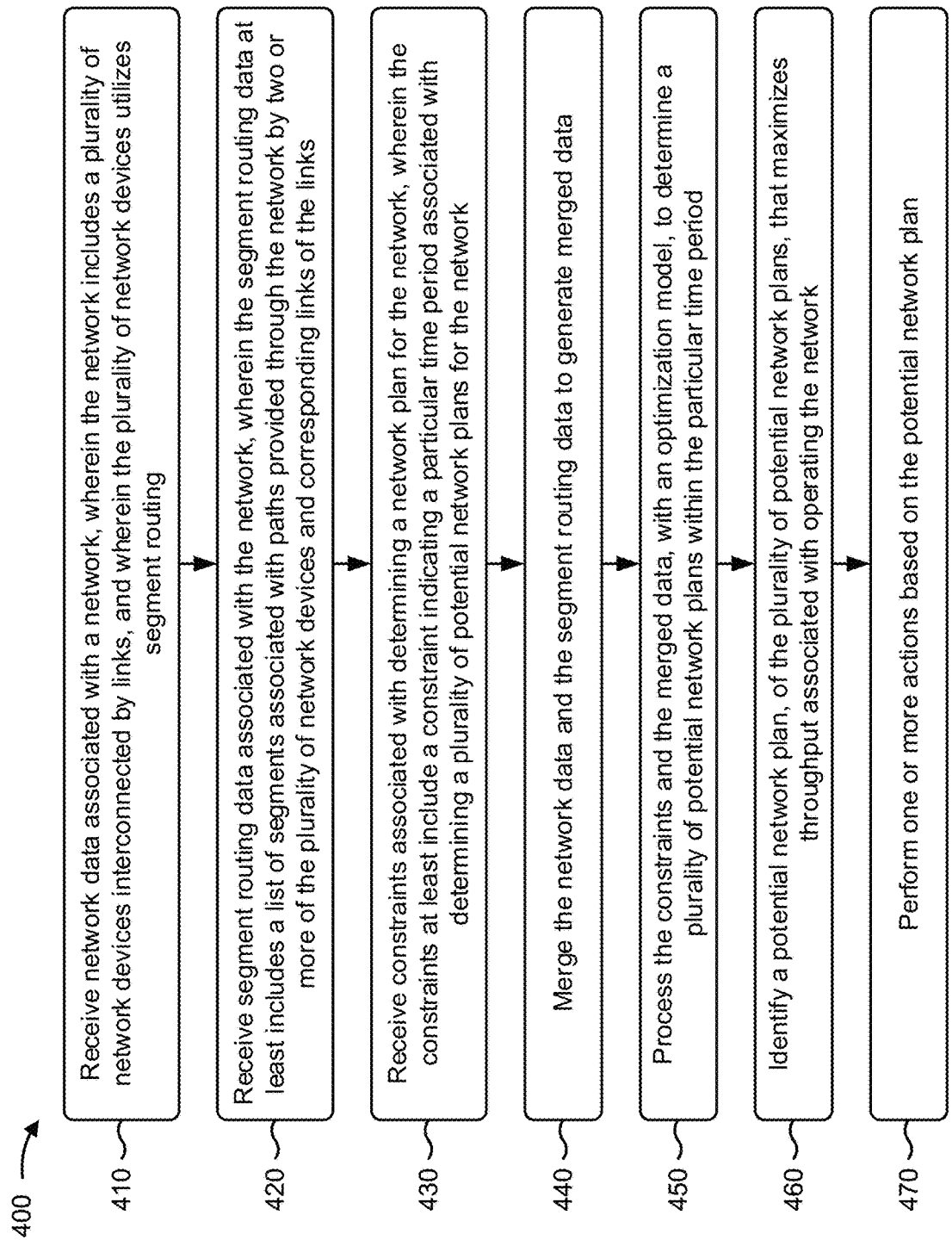
FIGS. 4-6 are flow charts of example processes for utilizing segment routing data and network data to determine optimized network plans and to implement an optimized network plan.

FIG. 4 is a flow chart of an example process 400 for utilizing segment routing data and network data to determine optimized network plans and to implement an optimized network plan. In some implementations, one or more process blocks of FIG. 4 may be performed by a controller platform (e.g., controller platform 220). In some implementations, one or more process blocks of FIG. 4 may be performed by another device or a group of devices separate from or including the controller platform, such as a client device (e.g., client device 210) and/or a network device (e.g., network device 240).

As shown in FIG. 4, process 400 may include receiving network data associated with a network, wherein the network includes a plurality of network devices interconnected by links, and wherein the plurality of network devices utilizes segment routing (block 410). For example, the controller platform (e.g., using computing resource 224, processor 320, memory 330, communication interface 370, and/or the like) may receive network data associated with a network, as described above in connection with FIGS. 1A-3. In some aspects, the network may include a plurality of network devices interconnected by links and the plurality of network devices may utilize segment routing.

As further shown in FIG. 4, process 400 may include receiving segment routing data associated with the network, wherein the segment routing data at least includes a list of segments associated with paths provided through the network by two or more of the plurality of network devices and corresponding links of the links (block 420). For example, the controller platform (e.g., using computing resource 224, processor 320, communication interface 370, and/or the like) may receive segment routing data associated with the network, as described above in connection with FIGS. 1A-3. In some aspects, the segment routing data may at least include a list of segments associated with paths provided through the network by two or more of the plurality of network devices and corresponding links of the links.

As further shown in FIG. 4, process 400 may include receiving constraints associated with determining a network plan for the network, wherein the constraints at least include a constraint indicating a particular time period associated with determining a plurality of potential network plans for the network (block 430). For example, the controller platform (e.g., using computing resource 224, processor 320, communication interface 370, and/or the like) may receive constraints associated with determining a network plan for the network, as described above in connection with FIGS. 1A-3. In some aspects, the constraints may at least include a constraint indicating a particular time period associated with determining a plurality of potential network plans for the network.

As further shown in FIG. 4, process 400 may include merging the network data and the segment routing data to generate merged data (block 440). For example, the controller platform (e.g., using computing resource 224, processor 320, memory 330, and/or the like) may merge the network data and the segment routing data to generate merged data, as described above in connection with FIGS. 1A-3.

As further shown in FIG. 4, process 400 may include processing the constraints and the merged data, with an optimization model, to determine a plurality of potential network plans within the particular time period (block 450). For example, the controller platform (e.g., using computing resource 224, processor 320, storage component 340, and/or the like) may process the constraints and the merged data, with an optimization model, to determine a plurality of potential network plans within the particular time period, as described above in connection with FIGS. 1A-3.

As further shown in FIG. 4, process 400 may include identifying a potential network plan, of the plurality of potential network plans, that maximizes throughput associated with operating the network (block 460). For example, the controller platform (e.g., using computing resource 224, processor 320, memory 330, and/or the like) may identify a potential network plan, of the plurality of potential network plans, that maximizes throughput associated with operating the network, as described above in connection with FIGS. 1A-3.

As further shown in FIG. 4, process 400 may include performing one or more actions based on the potential network plan (block 470). For example, the controller platform (e.g., using computing resource 224, processor 320, memory 330, storage component 340, communication interface 370, and/or the like) may perform one or more actions based on the potential network plan, as described above in connection with FIGS. 1A-3.

Process 400 may include additional implementations, such as any single implementation or any combination of implementations described below and/or in connection with one or more other processes described elsewhere herein.

In some implementations, the constraints may include a constraint indicating a failure threshold associated with paths provided through the network by the plurality of network devices and the links, a constraint indicating capacities of the links, a constraint indicating possible paths for a traffic demand of the network, a constraint indicating no possible paths for the traffic demand, and/or the like. In some implementations, the segment routing data may include data identifying the segments provided in the list of segments, statistics associated with the segments, forwarding instructions associated with the segments, and/or the like.

In some implementations, when performing the one or more actions, the controller platform may cause the potential network plan to be implemented in the network by the plurality of network devices, may provide, to a client device, information identifying the potential network plan, and/or the like. In some implementations, when identifying the potential network plan, of the plurality of potential network plans, that maximizes throughput associated with operating the network, the controller platform may determine a plurality of throughputs associated with the plurality of potential network plans based on the network data, and may identify the potential network plan that maximizes throughput associated with operating the network based on the plurality of throughputs associated with the plurality of potential network plans.

In some implementations, the constraints may include a particular constraint indicating a failure threshold associated with the paths provided through the network. In some implementations, the controller platform may cause the potential network plan to be implemented in the network by the plurality of network devices, may receive additional network data and additional segment routing data based on causing the potential network plan to be implemented in the network by the plurality of network devices, may modify the potential network plan based on the additional network data and the additional segment routing data to generate a modified potential network plan, and may cause the modified potential network plan to be implemented in the network by the plurality of network devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
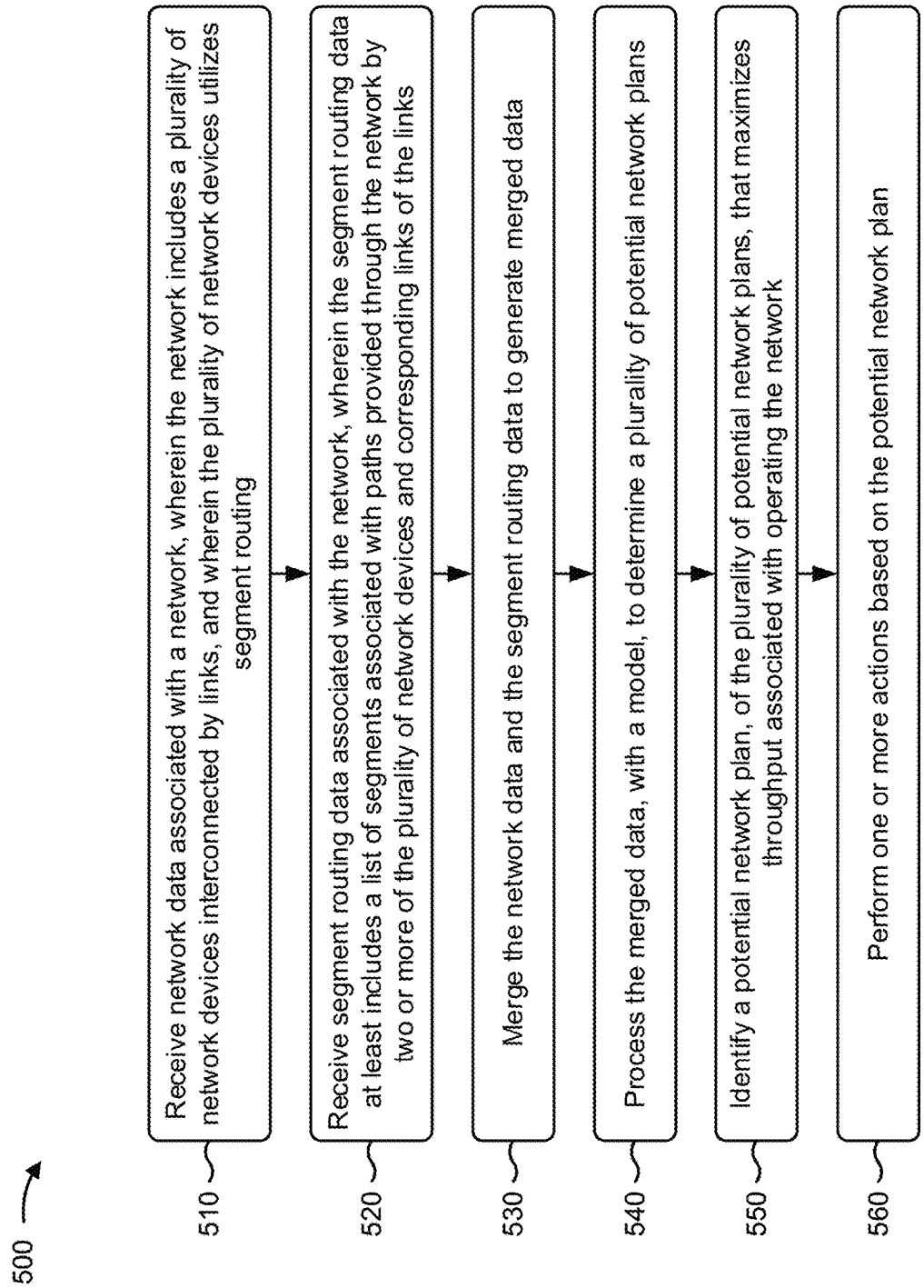

FIG. 5 is a flow chart of an example process 500 for utilizing segment routing data and network data to determine optimized network plans and to implement an optimized network plan. In some implementations, one or more process blocks of FIG. 5 may be performed by a controller platform (e.g., controller platform 220). In some implementations, one or more process blocks of FIG. 5 may be performed by another device or a group of devices separate from or including the controller platform, such as a client device (e.g., client device 210) and/or a network device (e.g., network device 240).

As shown in FIG. 5, process 500 may include receiving network data associated with a network, wherein the network includes a plurality of network devices interconnected by links, and wherein the plurality of network devices utilizes segment routing (block 510). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links and the plurality of network devices may utilize segment routing.

As further shown in FIG. 5, process 500 may include receiving segment routing data associated with the network, wherein the segment routing data at least includes a list of segments associated with paths provided through the network by two or more of the plurality of network devices and corresponding links of the links (block 520). For example, the controller platform (e.g., using computing resource 224, processor 320, communication interface 370, and/or the like) may receive segment routing data associated with the network, as described above in connection with FIGS. 1A-3. In some aspects, the segment routing data may at least include a list of segments associated with paths provided through the network by two or more of the plurality of network devices and corresponding links of the links.

As further shown in FIG. 5, process 500 may include merging the network data and the segment routing data to generate merged data (block 530). For example, the controller platform (e.g., using computing resource 224, processor 320, memory 330, and/or the like) may merge the network data and the segment routing data to generate merged data, as described above in connection with FIGS. 1A-3.

As further shown in FIG. 5, process 500 may include processing the merged data, with a model, to determine a plurality of potential network plans (block 540). For example, the controller platform (e.g., using computing resource 224, processor 320, storage component 340, and/or the like) may process the merged data, with a model, to determine a plurality of potential network plans, as described above in connection with FIGS. 1A-3.

As further shown in FIG. 5, process 500 may include identifying a potential network plan, of the plurality of potential network plans, that maximizes throughput associated with operating the network (block 550). For example, the controller platform (e.g., using computing resource 224, processor 320, memory 330, and/or the like) may identify a potential network plan, of the plurality of potential network plans, that maximizes throughput associated with operating the network, as described above in connection with FIGS. 1A-3.

As further shown in FIG. 5, process 500 may include performing one or more actions based on the potential network plan (block 560). For example, the controller platform (e.g., using computing resource 224, processor 320, memory 330, storage component 340, communication interface 370, and/or the like) may perform one or more actions based on the potential network plan, as described above in connection with FIGS. 1A-3.

Process 500 may include additional implementations, such as any single implementation or any combination of implementations described below and/or in connection with one or more other processes described elsewhere herein.

In some implementations, the network data may include data identifying the plurality of network devices, the links interconnecting the plurality of network devices, capacities of the plurality of network devices, capacities of the links interconnecting the plurality of network devices, the paths provided through the network, sources of the paths provided through the network, destinations of the paths provided through the network, capacities of the paths provided through the network, and/or the like.

In some implementations, the controller platform may provide, to a client device, information identifying the plurality of potential network plans; may receive, from the client device, information indicating a selection of the potential network plan; and may identify the potential network plan based on the selection. In some implementations, when identifying the potential network plan, of the plurality of potential network plans, that maximizes throughput associated with operating the network, the controller platform may identify the potential network plan, of the plurality of potential network plans, that minimizes costs associated with operating the network.

In some implementations, when identifying the potential network plan, of the plurality of potential network plans, that minimizes costs associated with operating the network, the controller platform may determine a plurality of costs associated with the plurality of potential network plans based on the network data, and may identify the potential network plan that minimizes costs associated with operating the network based on the plurality of costs associated with the plurality of potential network plans.

In some implementations, when processing the merged data, with the model, to determine the plurality of potential network plans, the controller platform may identify, based on the merged data, traffic congestion associated with one of the paths provided through the network, and may determine a particular network plan of the plurality of potential network plans that reduces the traffic congestion associated with the one of the paths.

In some implementations, when processing the merged data, with the model, to determine the plurality of potential network plans, the controller platform may identify, based on the merged data, a non-operational one of the links associated with one of the paths provided through the network, and may determine a particular network plan of the plurality of potential network plans that reroutes traffic away from the non-operational one of the links.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
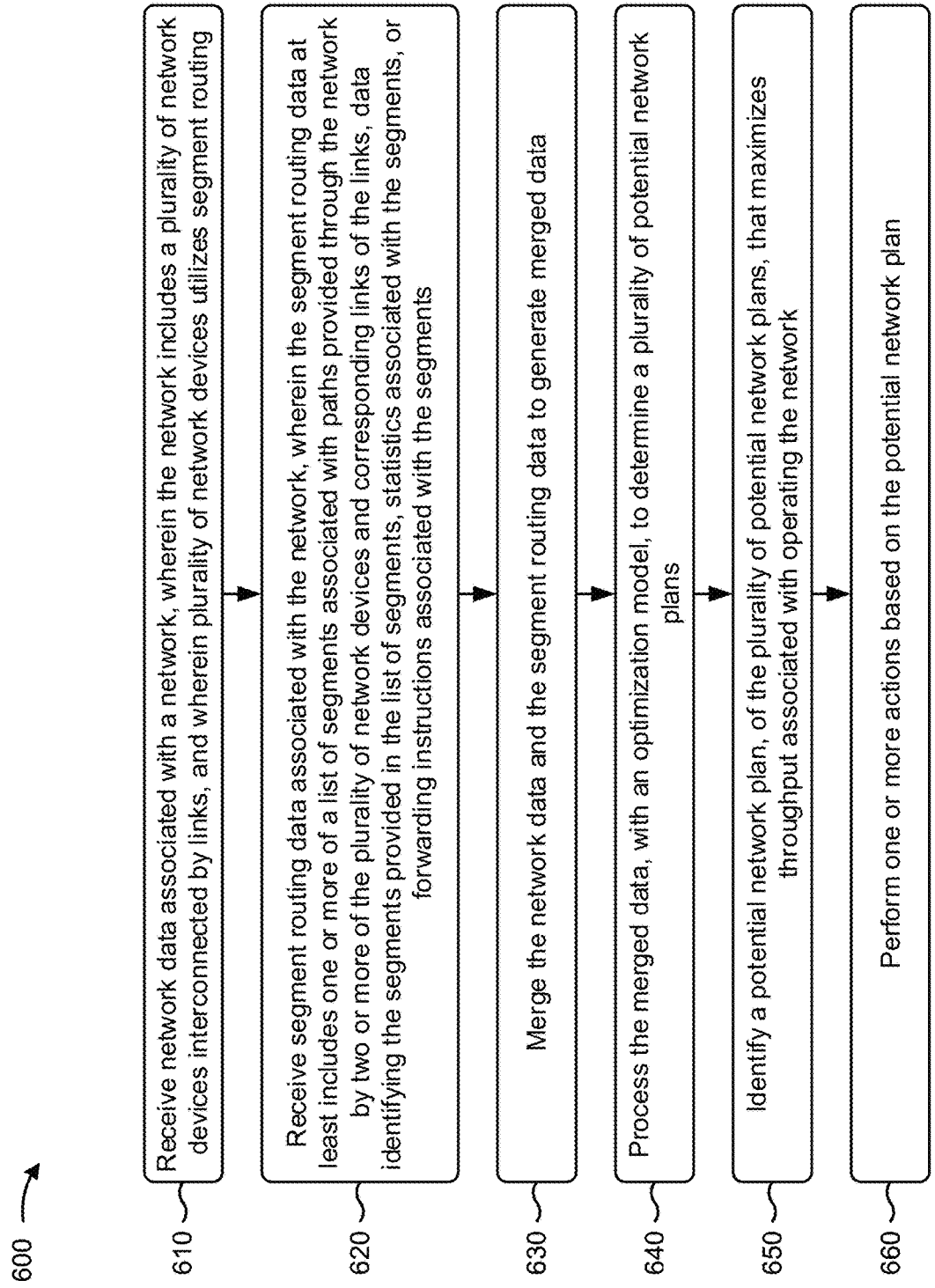

FIG. 6 is a flow chart of an example process 600 for utilizing segment routing data and network data to determine optimized network plans and to implement an optimized network plan. In some implementations, one or more process blocks of FIG. 6 may be performed by a controller platform (e.g., controller platform 220). In some implementations, one or more process blocks of FIG. 6 may be performed by another device or a group of devices separate from or including the controller platform, such as a client device (e.g., client device 210) and/or a network device (e.g., network device 240).

As shown in FIG. 6, process 600 may include receiving network data associated with a network, wherein the network includes a plurality of network devices interconnected by links, and wherein the plurality of network devices utilizes segment routing (block 610). For example, the controller platform (e.g., using computing resource 224, processor 320, memory 330, communication interface 370, and/or the like) may receive network data associated with a network, as described above in connection with FIGS. 1A-3. In some aspects, the network may include a plurality of network devices interconnected by links and the plurality of network devices may utilize segment routing.

As further shown in FIG. 6, process 600 may include receiving segment routing data associated with the network, wherein the segment routing data at least includes one or more of a list of segments associated with paths provided through the network by two or more of the plurality of network devices and corresponding links of the links, data identifying the segments provided in the list of segments, statistics associated with the segments, or forwarding instructions associated with the segments (block 620). For example, the controller platform (e.g., using computing resource 224, processor 320, communication interface 370, and/or the like) may receive segment routing data associated with the network, as described above in connection with FIGS. 1A-3. In some aspects, the segment routing data may at least include one or more of a list of segments associated with paths provided through the network by two or more of the plurality of network devices and corresponding links of the links, data identifying the segments provided in the list of segments, statistics associated with the segments, or forwarding instructions associated with the segments.

As further shown in FIG. 6, process 600 may include merging the network data and the segment routing data to generate merged data (block 630). For example, the controller platform (e.g., using computing resource 224, processor 320, memory 330, and/or the like) may merge the network data and the segment routing data to generate merged data, as described above in connection with FIGS. 1A-3.

As further shown in FIG. 6, process 600 may include processing the merged data, with an optimization model, to determine a plurality of potential network plans (block 640). For example, the controller platform (e.g., using computing resource 224, processor 320, storage component 340, and/or the like) may process the merged data, with an optimization model, to determine a plurality of potential network plans, as described above in connection with FIGS. 1A-3.

As further shown in FIG. 6, process 600 may include identifying a potential network plan, of the plurality of potential network plans, that maximizes throughput associated with operating the network (block 650). For example, the controller platform (e.g., using computing resource 224, processor 320, memory 330, and/or the like) may identify a potential network plan, of the plurality of potential network plans, that maximizes throughput associated with operating the network, as described above in connection with FIGS. 1A-3.

As further shown in FIG. 6, process 600 may include performing one or more actions based on the potential network plan (block 660). For example, the controller platform (e.g., using computing resource 224, processor 320, memory 330, storage component 340, communication interface 370, and/or the like) may perform one or more actions based on the potential network plan, as described above in connection with FIGS. 1A-3.

Process 600 may include additional implementations, such as any single implementation or any combination of implementations described below and/or in connection with one or more other processes described elsewhere herein.

In some implementations, when processing the merged data, with the optimization model, to determine the plurality of potential network plans, the controller platform may identify, based on the merged data, a non-operational one of the plurality of network devices associated with one of the paths provided through the network, and may determine a particular network plan of the plurality of potential network plans that reroutes traffic away from the non-operational one of the plurality of network devices.

In some implementations, when performing the one or more actions, the controller platform may cause the potential network plan to be implemented in the network by the plurality of network devices, may provide, to a client device, information identifying the potential network plan, and/or the like.

In some implementations, when identifying the potential network plan, of the plurality of potential network plans, that maximizes throughput associated with operating the network, the controller platform may determine a plurality of throughputs associated with the plurality of potential network plans based on the network data, and may identify the potential network plan that maximizes throughput associated with operating the network based on the plurality of throughputs associated with the plurality of potential network plans.

In some implementations, the controller platform may cause the potential network plan to be implemented in the network by the plurality of network devices, may receive additional network data and additional segment routing data based on causing the potential network plan to be implemented in the network by the plurality of network devices, may modify the potential network plan based on the additional network data and the additional segment routing data to generate a modified potential network plan, and may cause the modified potential network plan to be implemented in the network by the plurality of network devices.

In some implementations, when processing the merged data, with the optimization model, to determine the plurality of potential network plans, the controller platform may identify traffic congestion associated with one of the paths provided through the network, and may determine a particular network plan of the plurality of potential network plans that reduces the traffic congestion associated with the one of the paths.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, network data associated with a network,
      wherein the network includes a plurality of network devices interconnected by links, and
      wherein the plurality of network devices utilizes segment routing;
   receiving, by the device, segment routing data associated with the network,
      wherein the segment routing data at least includes a list of segments associated with paths provided through the network by two or more of the plurality of network devices and corresponding links of the links;
   receiving, by the device, constraints associated with determining a network plan for the network,
      wherein the constraints at least include a constraint indicating a particular time period associated with determining a plurality of potential network plans for the network;
   merging, by the device, the network data and the segment routing data to generate merged data;
   processing, by the device, the constraints and the merged data, with an optimization model, to determine the plurality of potential network plans within the particular time period;
   providing, by the device and to a client device, information identifying the plurality of potential network plans;
   receiving, by the device and from the client device, information indicating a selection of a potential network plan, from the plurality of potential network plans;
   identifying, by the device and based on the selection, the potential network plan; and
   performing, by the device, one or more actions based on the potential network plan.

2. The method of claim 1, wherein the constraints further include one or more of:
   a constraint indicating a failure threshold associated with paths provided through the network by the plurality of network devices and the links,
   a constraint indicating capacities of the links,
   a constraint indicating possible paths for a traffic demand of the network, or
   a constraint indicating no possible paths for the traffic demand.

3. The method of claim 1, wherein the segment routing data further includes data identifying one or more of:
   the segments provided in the list of segments,
   statistics associated with the segments, or
   forwarding instructions associated with the segments.

4. The method of claim 1, wherein performing the one or more actions comprises one or more of:
   causing the potential network plan to be implemented in the network by the plurality of network devices; or
   providing, to the client device, information identifying the potential network plan.

5. The method of claim 1, wherein identifying the potential network plan, of the plurality of potential network plans, that maximizes throughput associated with operating the network, comprises:
   determining a plurality of throughputs associated with the plurality of potential network plans based on the network data; and
   identifying the potential network plan that maximizes throughput associated with operating the network based on the plurality of throughputs associated with the plurality of potential network plans.

6. The method of claim 1, wherein the constraints include a particular constraint indicating a failure threshold associated with the paths provided through the network, and wherein the method further comprises:
   determining one or more of the plurality of potential network plans that fail to satisfy the particular constraint; and
   removing the one or more of the plurality of potential network plans from the plurality of potential network plans to generate a subset of the plurality of potential network plans, and
   wherein identifying the potential network plan includes:
   identifying the potential network plan from the subset of the plurality of potential network plans.

7. The method of claim 1, further comprising:
   causing the potential network plan to be implemented in the network by the plurality of network devices;
   receiving additional network data and additional segment routing data based on causing the potential network plan to be implemented in the network by the plurality of network devices;
   modifying the potential network plan based on the additional network data and the additional segment routing data to generate a modified potential network plan; and
   causing the modified potential network plan to be implemented in the network by the plurality of network devices.

8. A device, comprising:
   one or more memories; and
   one or more processors communicatively coupled to the one or more memories, to:
   receive network data associated with a network,
      wherein the network includes a plurality of network devices interconnected by links, and
      wherein the plurality of network devices utilizes segment routing;
   receive segment routing data associated with the network,
      wherein the segment routing data at least includes a list of segments associated with paths provided through the network by two or more of the plurality of network devices and corresponding links of the links;
   merge the network data and the segment routing data to generate merged data;
   process the merged data, with a model, to determine a plurality of potential network plans;
   identify a potential network plan, of the plurality of potential network plans, that maximizes throughput associated with operating the network; and
   perform one or more actions based on the potential network plan.

9. The device of claim 8, wherein the network data includes data identifying one or more of:
   the plurality of network devices,
   the links interconnecting the plurality of network devices,
   capacities of the plurality of network devices,
   capacities of the links interconnecting the plurality of network devices,
   the paths provided through the network,
   sources of the paths provided through the network,
   destinations of the paths provided through the network, or
   capacities of the paths provided through the network.

10. The device of claim 8, wherein the one or more processors are further to:
    provide, to a client device, information identifying the plurality of potential network plans; and
    receive, from the client device, information indicating a selection of the potential network plan,
       wherein the one or more processors, when identifying the potential network plan, are to:
       identify the potential network plan based on the selection.

11. The device of claim 8, wherein the one or more processors, when identifying the potential network plan, of the plurality of potential network plans, that maximizes throughput associated with operating the network, are to:
    identify the potential network plan, of the plurality of potential network plans, that minimizes costs associated with operating the network.

12. The device of claim 11, wherein the one or more processors, when identifying the potential network plan, of the plurality of potential network plans, that minimizes costs associated with operating the network, are to:
    determine a plurality of costs associated with the plurality of potential network plans based on the network data,
       wherein a cost of each network plan of the plurality of network plans is determined based on at least one of:
       a quantity of network devices utilized in the potential network plan,
       quantities and lengths of links utilized in the potential network plan, or
       penalties associated with failures of the potential network plans in meeting traffic demands of the network; and
    identify the potential network plan that minimizes costs associated with operating the network based on the plurality of costs associated with the plurality of potential network plans.

13. The device of claim 8, wherein the one or more processors, when processing the merged data, with the model, to determine the plurality of potential network plans, are to:
    identify, based on the merged data, traffic congestion associated with one of the paths provided through the network; and
    determine a particular network plan of the plurality of potential network plans that reduces the traffic congestion associated with the one of the paths.

14. The device of claim 8, wherein the one or more processors, when processing the merged data, with the model, to determine the plurality of potential network plans, are to:
    identify, based on the merged data, a non-operational one of the links associated with one of the paths provided through the network; and
    determine a particular network plan of the plurality of potential network plans that reroutes traffic away from the non-operational one of the links.

15. A non-transitory computer-readable medium storing instructions, the instructions comprising:
    one or more instructions that, when executed by one or more processors, cause the one or more processors to:

receive network data associated with a network,
  wherein the network includes a plurality of network devices interconnected by links, and
  wherein the plurality of network devices utilizes segment routing;
receive segment routing data associated with the network,
  wherein the segment routing data at least includes one or more of:
    a list of segments associated with paths provided through the network by two or more of the plurality of network devices and corresponding links of the links,
    data identifying segments provided in the list of segments,
    statistics associated with the segments, or
    forwarding instructions associated with the segments;
merge the network data and the segment routing data to generate merged data;
process the merged data, with an optimization model, to determine a plurality of potential network plans;
provide, to a client device, information identifying the plurality of potential network plans;
receive, from the client device, information indicating a selection of a potential network plan, from the plurality of potential network plans;
identify the potential network plan, based on the selection; and
perform one or more actions based on the potential network plan.

16. The non-transitory computer-readable medium of claim 15, wherein the one or more instructions, that cause the one or more processors to process the merged data, with the optimization model, to determine the plurality of potential network plans, cause the one or more processors to:
  identify, based on the merged data, a non-operational one of the plurality of network devices associated with one of the paths provided through the network; and
  determine a particular network plan of the plurality of potential network plans that reroutes traffic away from the non-operational one of the plurality of network devices.

17. The non-transitory computer-readable medium of claim 15, wherein the one or more instructions, that cause the one or more processors to perform the one or more actions, cause the one or more processors to one or more of:
  cause the potential network plan to be implemented in the network by the plurality of network devices; or
  provide, to the client device, information identifying the potential network plan.

18. The non-transitory computer-readable medium of claim 15, wherein the one or more instructions, that cause the one or more processors to identify the potential network plan, of the plurality of potential network plans, that maximizes throughput associated with operating the network, cause the one or more processors to:
  determine a plurality of throughputs associated with the plurality of potential network plans based on the network data; and
  identify the potential network plan that maximizes throughput associated with operating the network based on the plurality of throughputs associated with the plurality of potential network plans.

19. The non-transitory computer-readable medium of claim 15, wherein the instructions further comprise:
  one or more instructions that, when executed by the one or more processors, cause the one or more processors to:
    cause the potential network plan to be implemented in the network by the plurality of network devices;
    receive additional network data and additional segment routing data based on causing the potential network plan to be implemented in the network by the plurality of network devices;
    modify the potential network plan based on the additional network data and the additional segment routing data to generate a modified potential network plan; and
    cause the modified potential network plan to be implemented in the network by the plurality of network devices.

20. The non-transitory computer-readable medium of claim 15, wherein the one or more instructions, that cause the one or more processors to process the merged data, with the optimization model, to determine the plurality of potential network plans, cause the one or more processors to:
  identify traffic congestion associated with one of the paths provided through the network; and
  determine a particular network plan of the plurality of potential network plans that reduces the traffic congestion associated with the one of the paths.

* * * * *